(12) United States Patent
Shi et al.

(10) Patent No.: US 11,203,189 B2
(45) Date of Patent: Dec. 21, 2021

(54) HEAT-SEAL LID WITH NON-HEAT SEALING LAYER AND HYDROPHOBIC OVERCOAT

(71) Applicant: Bemis Company, Inc., Neenah, WI (US)

(72) Inventors: Xiangke Shi, Neenah, WI (US); Kevin P. Nelson, Appleton, WI (US)

(73) Assignee: Bemis Company, Inc., Neenah, WI (US)

(*) Notice: Subject to any disclaimer, the term of this patent is extended or adjusted under 35 U.S.C. 154(b) by 491 days.

(21) Appl. No.: 16/309,797

(22) PCT Filed: Jun. 15, 2016

(86) PCT No.: PCT/US2016/037639
§ 371 (c)(1),
(2) Date: Dec. 13, 2018

(87) PCT Pub. No.: WO2017/217982
PCT Pub. Date: Dec. 21, 2017

(65) Prior Publication Data
US 2019/0240960 A1   Aug. 8, 2019

(51) Int. Cl.
*B32B 27/10* (2006.01)
*B65D 77/20* (2006.01)
(Continued)

(52) U.S. Cl.
CPC ............. *B32B 27/10* (2013.01); *B32B 3/02* (2013.01); *B32B 7/02* (2013.01); *B32B 7/12* (2013.01);
(Continued)

(58) Field of Classification Search
CPC ........ B65D 17/40; B65D 43/02; B65D 77/20; B65D 77/2024; B32B 27/10; B32B 3/02;
(Continued)

(56) References Cited

U.S. PATENT DOCUMENTS 2,771,378 A   11/1956   Motter et al.
3,396,046 A   8/1968   Raphael et al.
(Continued)

FOREIGN PATENT DOCUMENTS

EP   1366888 A1   12/2003
EP   2397319 B1   12/2011
(Continued)

OTHER PUBLICATIONS

S.W. Muzenski et al., "The Development of Hydrophobic and Superhydrophobic Cementitious Composites.", 4th International Conference on the Durability of Concrete Structures, Jul. 24-26, 2014, 6 pages, Purdue University, West Lafayette, Indiana, USA.

*Primary Examiner* — J. Gregory Pickett
*Assistant Examiner* — Niki M Eloshway (57) ABSTRACT

A lidding film to use in food packaging, or the packaging of suitable non-food products, includes a substrate having an outer major surface on which is disposed at least a 5 heat-sealing layer (HS layer), a non-heat-sealing layer (NTIS layer), and a hydrophobic coating. On a side of the lidding film that corresponds to the outer major surface of the substrate is a peripheral region that encircles a central region. At least a first portion of the HS layer fills the peripheral region, and the NIS layer is absent as a cover on, or does not cover, the HIS layer in the peripheral region. At least a first portion of the NHS layer fills the 10 central region, and the HS layer is absent as a cover on, or does not cover, the NIS layer in the central region.

18 Claims, 8 Drawing Sheets

(51) Int. Cl.
| | |
|---|---|
| *B32B 29/00* | (2006.01) |
| *B32B 7/12* | (2006.01) |
| *B65D 17/40* | (2006.01) |
| *B32B 15/12* | (2006.01) |
| *B32B 3/02* | (2006.01) |
| *B65D 43/02* | (2006.01) |
| *B32B 7/02* | (2019.01) |
| *B32B 27/32* | (2006.01) |
| *B32B 27/08* | (2006.01) |
| *B32B 27/36* | (2006.01) |

(52) U.S. Cl.
CPC .............. *B32B 15/12* (2013.01); *B32B 27/08* (2013.01); *B32B 27/32* (2013.01); *B32B 27/36* (2013.01); *B32B 29/005* (2013.01); *B65D 17/40* (2018.01); *B65D 43/02* (2013.01); *B65D 77/20* (2013.01); *B65D 77/2024* (2013.01); *B32B 2250/44* (2013.01); *B32B 2255/10* (2013.01); *B32B 2255/20* (2013.01); *B32B 2255/205* (2013.01); *B32B 2307/31* (2013.01); *B32B 2307/538* (2013.01); *B32B 2307/73* (2013.01); *B32B 2307/732* (2013.01); *B32B 2435/02* (2013.01); *B32B 2439/70* (2013.01); *B65D 2203/00* (2013.01); *B65D 2577/2025* (2013.01)

(58) Field of Classification Search
CPC .. B32B 7/02; B32B 7/12; B32B 15/12; B32B 27/08; B32B 27/32; B32B 27/36; B32B 29/005
USPC ........................................................ 220/359
See application file for complete search history.

(56) References Cited

U.S. PATENT DOCUMENTS

| | | | |
|---|---|---|---|
| 3,808,027 | A | 4/1974 | Anderson et al. |
| 3,931,428 | A | 1/1976 | Reick |
| 4,303,708 | A | 12/1981 | Gebhardt et al. |
| 4,801,041 | A | 1/1989 | Takata et al. |
| 5,141,126 | A | 8/1992 | Takata et al. |
| 5,508,075 | A | 4/1996 | Roulin et al. |
| 5,721,027 | A | 2/1998 | Frisk et al. |
| 5,983,437 | A | 11/1999 | Wakat |
| 6,335,027 | B1 | 1/2002 | Levy |
| 6,368,686 | B1 | 4/2002 | Lofgren et al. |
| 6,683,126 | B2 | 1/2004 | Keller et al. |
| 6,709,687 | B2 | 3/2004 | Pockat et al. |
| 6,743,516 | B2 | 6/2004 | Murphy et al. |
| 6,800,354 | B2 | 10/2004 | Baumann et al. |
| 6,811,856 | B2 | 11/2004 | Nun et al. |
| 7,544,411 | B2 | 6/2009 | Baumann et al. |
| 8,647,709 | B2 | 2/2014 | Alger |
| 8,746,490 | B2 | 6/2014 | Huffer et al. |
| 9,327,879 | B2 | 5/2016 | Sekiguchi et al. |
| 2005/0019586 | A1 | 1/2005 | Bontinck et al. |
| 2005/0186414 | A1 | 8/2005 | Su et al. |
| 2005/0276525 | A1* | 12/2005 | Hebert ............... B65D 75/5833 383/203 |
| 2011/0112458 | A1* | 5/2011 | Holm ..................... A61L 15/58 602/54 |
| 2012/0118886 | A1* | 5/2012 | Sekiguchi ............ B32B 38/164 220/200 |
| 2012/0152952 | A1* | 6/2012 | Cheong ................ B65D 51/185 220/255 |
| 2014/0263331 | A1* | 9/2014 | Thorstensen-Woll ....................... B65D 55/06 220/270 |
| 2014/0296409 | A1* | 10/2014 | Sikka ...................... C08K 9/06 524/365 |
| 2015/0011668 | A1 | 1/2015 | Kolb et al. |
| 2015/0017334 | A1 | 1/2015 | Sekiguchi et al. |
| 2015/0175317 | A1 | 6/2015 | Imai et al. |
| 2015/0247079 | A1 | 9/2015 | Nishikawa et al. |

FOREIGN PATENT DOCUMENTS

| | | |
|---|---|---|
| EP | 2666627 B1 | 11/2013 |
| EP | 2762537 A1 | 8/2014 |
| EP | 2857190 A1 | 4/2015 |
| JP | 5131462 B2 | 1/2013 |
| JP | 2013001427 A | 1/2013 |
| JP | 2013071336 A | 4/2013 |
| JP | 2013189238 A | 9/2013 |
| JP | 2013208816 A | 10/2013 |
| JP | 2013208817 A | 10/2013 |
| JP | 2013209126 A | 10/2013 |
| JP | 2014024188 A | 2/2014 |
| JP | 2014046983 A | 3/2014 |
| JP | 2014051295 A | 3/2014 |
| JP | 2014054757 A | 3/2014 |
| JP | 2014055013 A | 3/2014 |
| JP | 2014156256 A | 8/2014 |
| JP | 2014156257 A | 8/2014 |
| JP | 2014201360 A | 10/2014 |
| JP | 2014218007 A | 11/2014 |
| JP | 2015034038 A | 2/2015 |
| JP | 2015054704 A | 3/2015 |
| JP | 2015131658 A | 7/2015 |
| JP | 2015131659 A | 7/2015 |
| JP | 5793936 B2 | 8/2015 |
| JP | 2015193115 A | 11/2015 |
| JP | 2016002706 A | 1/2016 |
| JP | 5879787 B2 | 2/2016 |
| JP | 5880218 B2 | 2/2016 |
| JP | 5915012 B2 | 4/2016 |
| JP | 5924078 B2 | 4/2016 |
| JP | 2016064529 A | 4/2016 |
| JP | 2016064589 A | 4/2016 |
| JP | 5929076 B2 | 5/2016 |
| JP | 2016094254 A | 5/2016 |
| JP | 2016112821 A | 6/2016 |
| WO | 8601772 A1 | 3/1986 |
| WO | 2012156172 A1 | 11/2012 |
| WO | 2012156173 A1 | 11/2012 |

* cited by examiner

HEAT-SEAL LID WITH NON-HEAT SEALING LAYER AND HYDROPHOBIC OVERCOAT

FIELD OF THE INVENTION

The invention relates generally to packaging for products, such as food packaging, or the packaging or storage of other suitable food or non-food products. The invention is particularly applicable to lidding films for such packaging, and sealed containers or packaging that incorporates such lidding films.

BACKGROUND

Many different types of packaging products are known. In the case of packaging products for foods, some of the known types include: metal cans e.g. for soups; bags e.g. for potato chips; stand up pouches (SUPs) e.g. for frozen vegetables; rigid polypropylene containers e.g. for sour cream or margarine tubs; bag-in-box packages e.g. for wine or other beverages; retort packaging e.g. for military MREs; and sealed containers such as cups or tubs that are sealed with a lidding film, e.g. for yogurt, pudding, and similar foods.

SUMMARY

We have developed a new family of films that can be used as lids to seal the openings of cups, tubs, or other containers of the type currently used for packaging yogurt, pudding, and similar foods, even though the new lidding films, and the packages in which they are used, are not limited to such applications. The new lidding films employ a suitable substrate that carries on one side thereof some combination of a heat-sealing layer ("HS" layer), a non-heat-sealing layer ("NHS" layer), and a hydrophobic overcoat or coating.

The HS layer can be used to heat-seal the lidding film to a container to provide a sealed package.

The NHS layer can serve several functions. By including the NHS layer in the film construction, the HS layer can in at least some cases be made thinner without degrading the quality of the heat seal between the lidding film and the container. This can save on material costs for the lidding film, as well as reducing the weight and increasing the physical flexibility of the film. The NHS layer can also serve a protective function when used as an overcoat for a primed indicia layer, discussed below, to prevent smearing or other degradation of the ink or other material used to form the indicia.

The hydrophobic coating can be used for product-release purposes to prevent or discourage the product located inside the package (such as yogurt, or another suitable food or non-food product) from accumulating, building up, or otherwise sticking or attaching to the lidding film. This may be of particular benefit in cases where alphanumeric characters, symbols, graphics, or other indicia are included on the same side of the lidding film, since the hydrophobic coating can keep this side of the film relatively clean to allow a user to easily view the indicia after peeling off the lid. Alternatively, such indicia need not be incorporated into the lidding film.

The NHS layer may be made to have a textured or roughened surface on which the hydrophobic coating is applied. The texturing may be accomplished by incorporating beads or other particles of suitable size and concentration into the NHS layer, or it may be accomplished by embossing, or both embossing and beads/particles can be used.

At least one of the HS layer and NHS layer is patterned so as to be present in some regions, areas, or vicinities of the film but not in others, and in some cases both of these layers may be patterned. The hydrophobic coating may also be patterned. In order to describe or define the patterning, we make reference to different regions on the side of the lidding film at issue, in particular, to a peripheral region, a central region, and in some cases an intermediate region, as explained further below.

We therefore describe, among other things, lidding films that have on one side thereof a peripheral region that encircles a central region, the lidding film also including a substrate having an outer major surface on which is disposed at least a heat-sealing layer (HS layer), a non-heat-sealing layer (NHS layer), and a hydrophobic coating. At least a first portion of the HS layer fills the peripheral region, and the NHS layer is absent as a cover on the HS layer in the peripheral region. For example, the NHS layer may not cover the HS layer in the peripheral region. At least a first portion of the NHS layer fills the central region, and the HS layer is absent as a cover on the NHS layer in the central region. For example, the HS layer may not cover the NHS layer in the central region. At least a first portion of the hydrophobic coating covers at least part of the first portion of the NHS layer in the central region.

In some cases, the NHS layer may be patterned, and the HS layer may be substantially coextensive with the outer major surface of the substrate. In other cases, the HS layer may be patterned, and the NHS layer may be substantially coextensive with the outer major surface. In still other cases, both the NHS layer and the HS layer may be patterned. The NHS layer and the HS layer may overlap in an intermediate region between the peripheral region and the central region. The hydrophobic coating—which may be ultrahydrophobic, or even superhydrophobic—may in some cases be patterned, and in other cases may not be patterned, and it may contact only the NHS layer (whether all or only a portion thereof), while in other cases it may contact both the HS layer and the NHS layer. The HS layer may be or comprise a first lacquer, and the NHS layer may be or comprise a second lacquer having a softening temperature different than that of the HS layer. In some cases, the softening temperature of the NITS layer may be higher than, that of the HS layer, such that the NHS layer would not soften or melt under the conditions used to soften or melt the HS layer. In other cases, the NHS layer may have a lower softening temperature than that of the NHS layer, and yet the NHS layer may nevertheless be adapted to avoid sealing due to its position or configuration on the lidding film. The lidding film may include a first indicia layer viewable from the one side of the lidding film, or a second indicia layer viewable from the opposite side of the lidding film, or both the first and second indicia layers. The lidding film may also be in the form of a continuous sheet or web from which numerous container-sized pieces of lidding film may be cut or stamped, such that the peripheral region is one of a plurality of peripheral regions, and the central region is one of a plurality of central regions.

We also describe packages that incorporate the disclosed lidding films. Such a package may include a container, and the lidding film sealed to the container. The container may define a cavity in which a food product or other product is placed, and a rim that encircles or surrounds an opening of the cavity. At least a portion of the HS layer of the lidding film may sealably contact the rim. The rim may be flared or may otherwise protrude laterally to define a flange alone which the lidding film seals to the container.

Related articles, systems, and methods can also be found in the appended claims and/or in the detailed description that follows.

Those and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and where.

DETAILED DESCRIPTION

As mentioned above, we have developed a new family of films that can be used as lids to seal the openings of cups, tubs, or other containers of the type currently used for packaging yogurt, pudding, and similar foods, even though the new lidding films and packages are not limited to such applications.

In the discussion that follows, the films and packages will be described primarily in the context of food packaging, such as for yogurt, pudding, or other semi-solid or liquid food items, any of which may be shelf-stable, refrigerated, or frozen. Nevertheless, the reader will understand that the films and packages are not limited to food applications, hut can also be used with non-food materials or items. The films and packages are optionally compatible with consumer trends and preferences such as convenience of use and recyclability.

Figures 1, 2, 3:
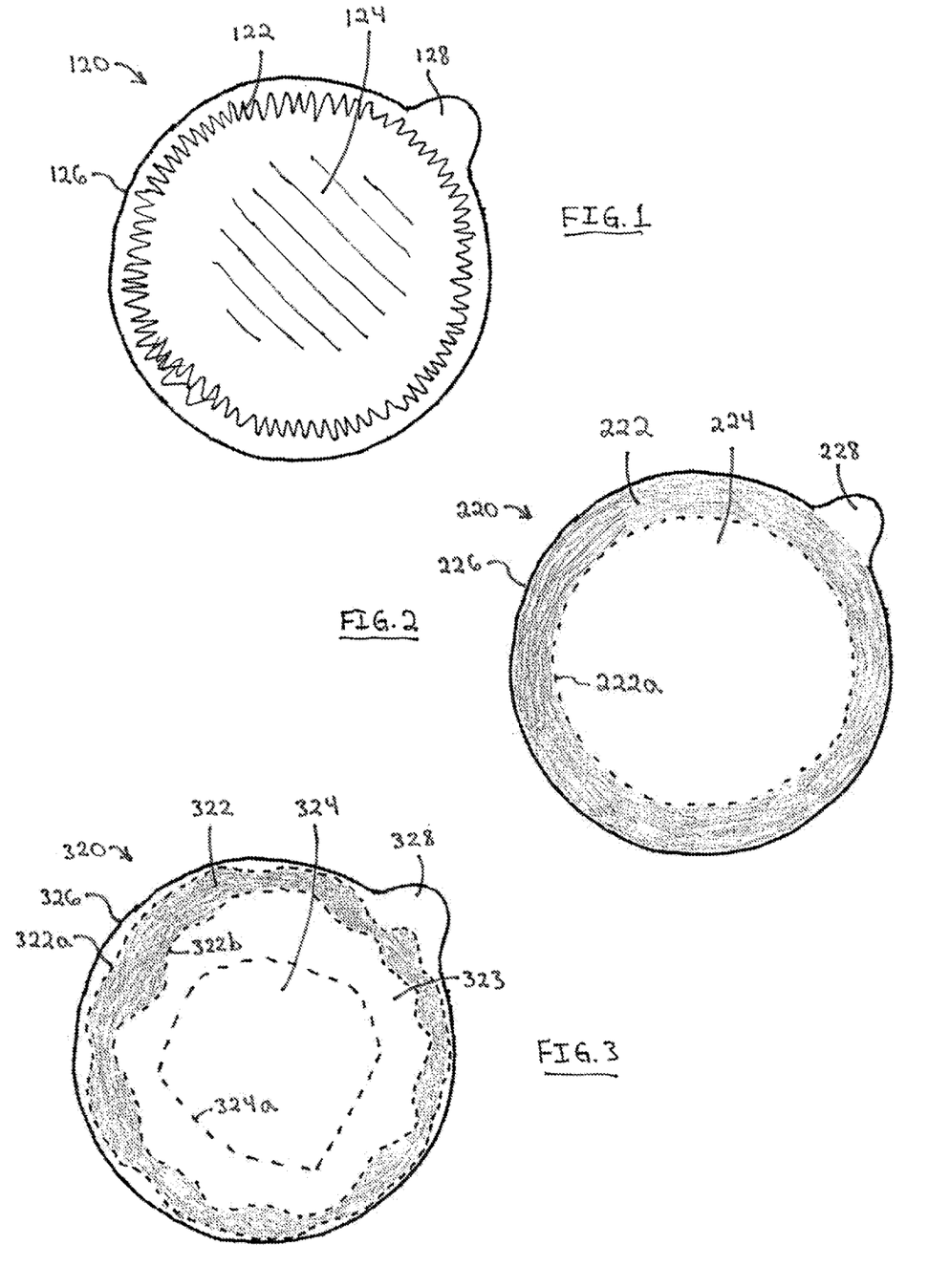
FIG. 1 is a schematic plan view of one side of a lidding film to very generally illustrate a possible peripheral region and a possible central region.
FIG. 2 is a schematic plan view of a lidding film whose peripheral and central regions are regular, symmetrical, and contiguous.
FIG. 3 is a schematic plan view of a lidding film whose peripheral and central regions are irregular, asymmetrical, and non-contiguous.

In FIG. 1, we see a simplified plan view of such a lidding film 120. The lidding film 120 has two opposed major surfaces or sides, one of which is seen from the vantage point of FIG. 1. On this side of the film 120, a number of distinct layers or coatings (not shown in FIG. 1) are added, applied, or otherwise formed. One, some, or all of these layers may be pattern-wise applied such that they reside at some locations, hut not all locations, on this side of the lidding film 120. The patterning of a given layer can be accomplished by any suitable process, whether an additive process (such as where the layer material is deposited or laid down at some locations but not other locations), or a subtractive process (such as where the layer material is initially deposited or laid down at all locations on the side of the film, and later removed at some locations), or a combination thereof. In any case, it is useful to define two areas or regions on this side of the lidding film 120 to assist in the descriptions of the various layers: a peripheral region 122, and a central region 124. These regions are depicted in a rudimentary style in FIG. 1 for generality. They are related to each other by the fact that the peripheral region 122 encircles the central region 124. This should not be construed to imply that either the peripheral region or the central region is circular in shape, although one or both such regions may be so shaped to seal to a circular-shaped container, if desired.

Some or all of the peripheral region 122 may be close to, and in some cases contiguous with, a boundary or edge 126 of the lidding film 120. The boundary or edge 126 of FIG. 1 represents a physical boundary or edge of the film 120, but it may alternatively be construed to represent a predefined path on a larger web of lidding film material that, upon being cut by a knife, die, or other known cutting device, becomes the physical boundary or edge of the lidding film. The edge 126 is shown as having an approximately circular shape, but this is not meant to be limiting. Other curved or non-curved shapes, including rectangles, squares, and other polygonal shapes are also contemplated for the edge 126, depending on the shape of the container to which the lidding film attaches. The edge 126 also includes a protuberance or tab 128 that a user may grasp to initiate separation of the lidding film 120 from the container (not shown) the lidding film attaches to. As discussed further below, sealing of the lidding film 120 to such container generally occurs along a rim of the container and along, or in overlapping fashion with, the peripheral region 122 of the lidding film 120.

The central region 124 may be centrally located relative to the shape defined by the edge 126, for example the central region 124 may include the geometric center or centroid of such shape, but in other cases the central region may not be so located, and may not include such centroid. The peripheral and central regions may in some cases be fully contiguous with each other (e.g., sharing a common boundary along an entire circumference of the central region), while in other cases they may be only partially contiguous (e.g., sharing a common boundary along only part of the circumference of the central region), and in still other cases they may be completely non-contiguous (e.g., sharing no common boundary). Some illustrative examples are shown in FIGS. 2 and 3.

In FIG. 2, a lidding film 220 has a boundary or edge 226, which may be the same as or similar to the edge 126 (FIG. 1), and the edge 226 includes a protuberance or tab 228 which may be the same as or similar to the tab 128 (FIG. 1). A peripheral region 222 encircles a central region 224. The peripheral and central regions 222, 224 are regular, symmetrical, and fully contiguous with each other along a common boundary 222a.

In FIG. 3, a lidding film 320 has a boundary or edge 326, which may be the same as or similar to the edge 126 (FIG. 1), and the edge 326 includes a protuberance or tab 328 which may be the same as or similar to the tab 128 (FIG. 1). A peripheral region 322, defined by irregular outer and inner boundaries 322a, 322b, respectively, encircles a central region 324, which is defined by an irregular outer boundary 324a. The peripheral and central regions 322, 324 are irregular, asymmetrical, and non-contiguous with each other. The space between the regions 322, 324, i.e., the space bordered by the boundaries 322b, 324a, defines an intermediate region 323, which also encircles the central region 324.

Figure 4A:
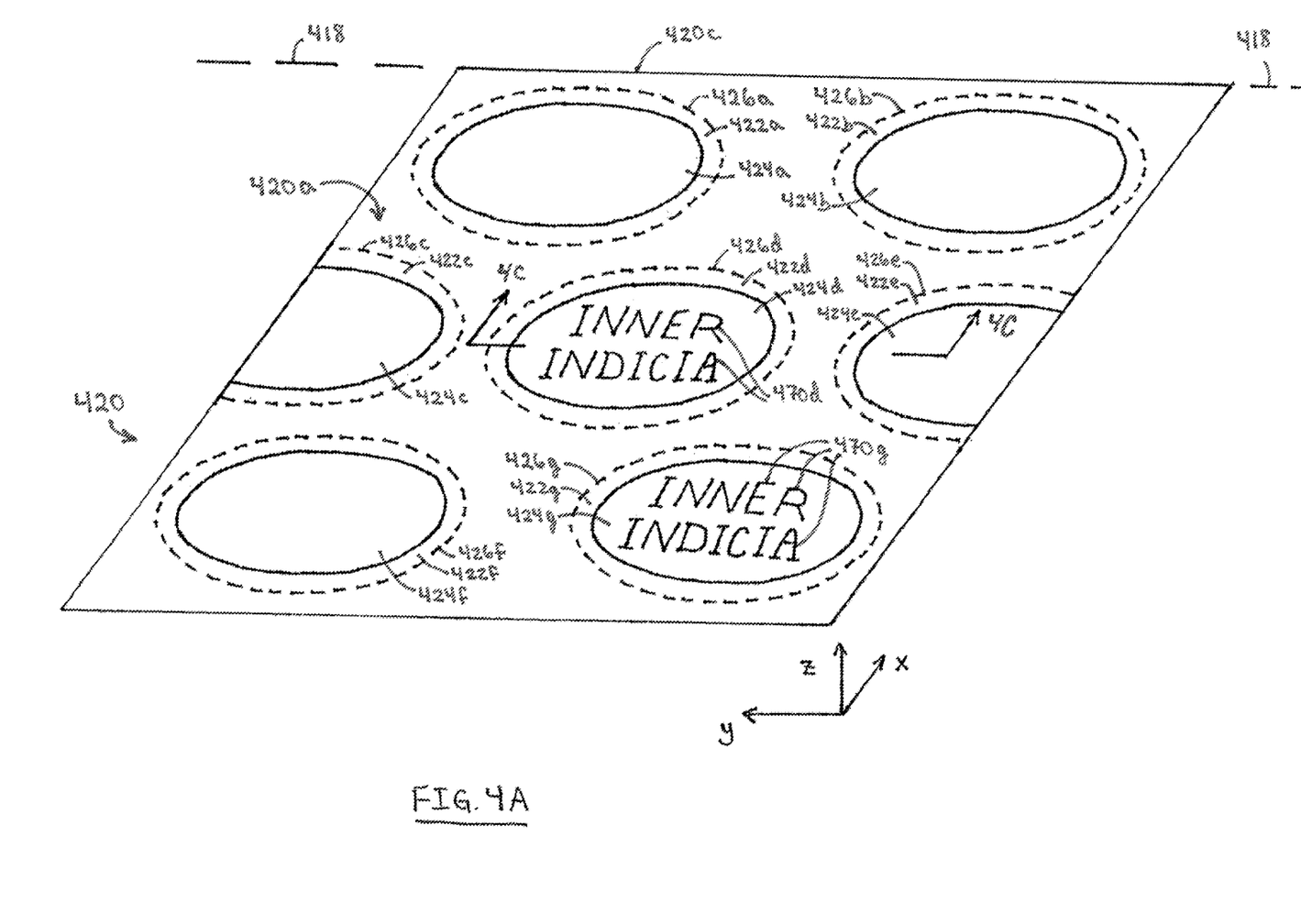
FIG. 4A is a schematic perspective, view of a one side of a lidding film in the form of a web.
Figure 4B:
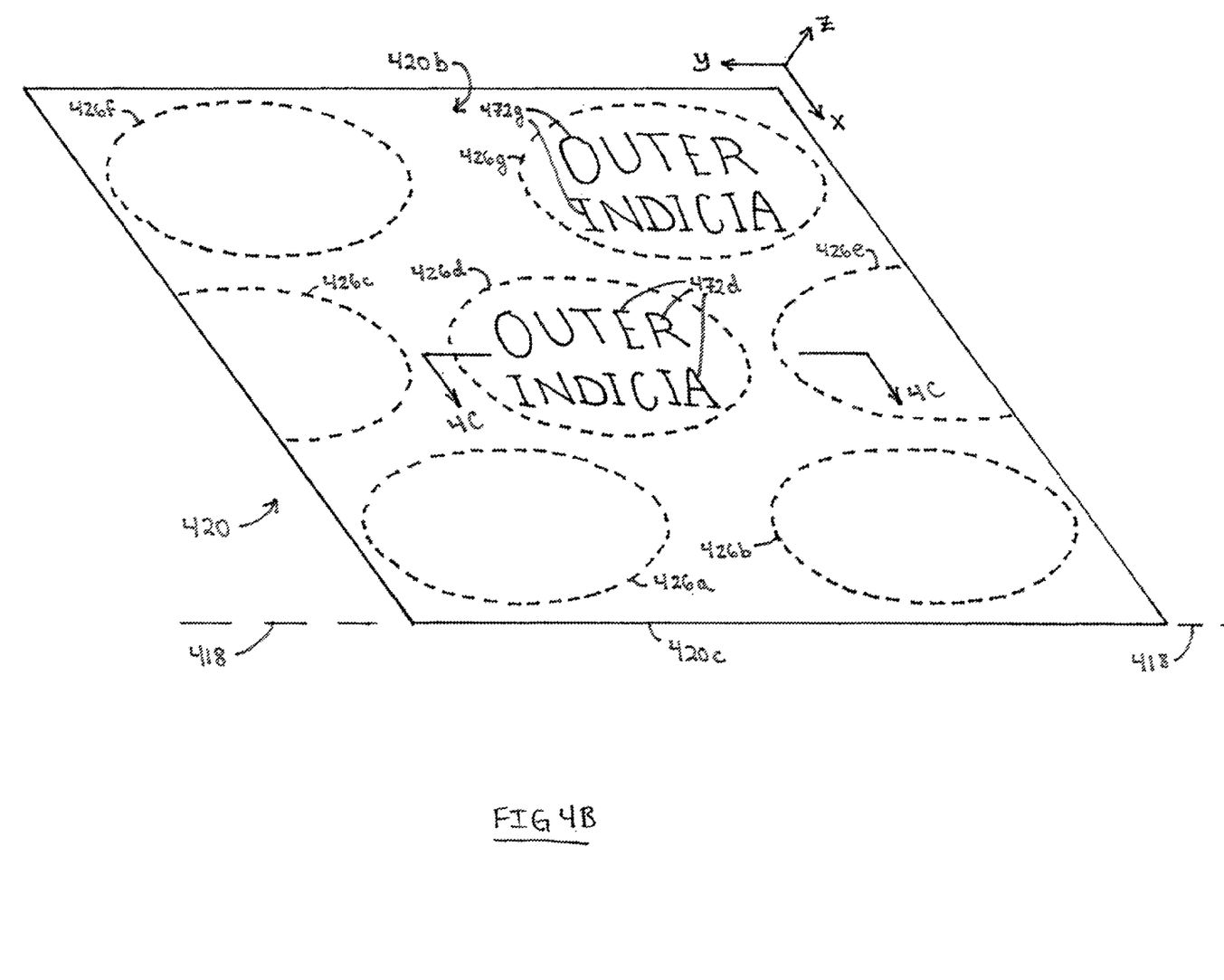
FIG. 4B is a schematic perspective view of the opposite side of the lidding film of FIG. 4A.
Figure 4C:
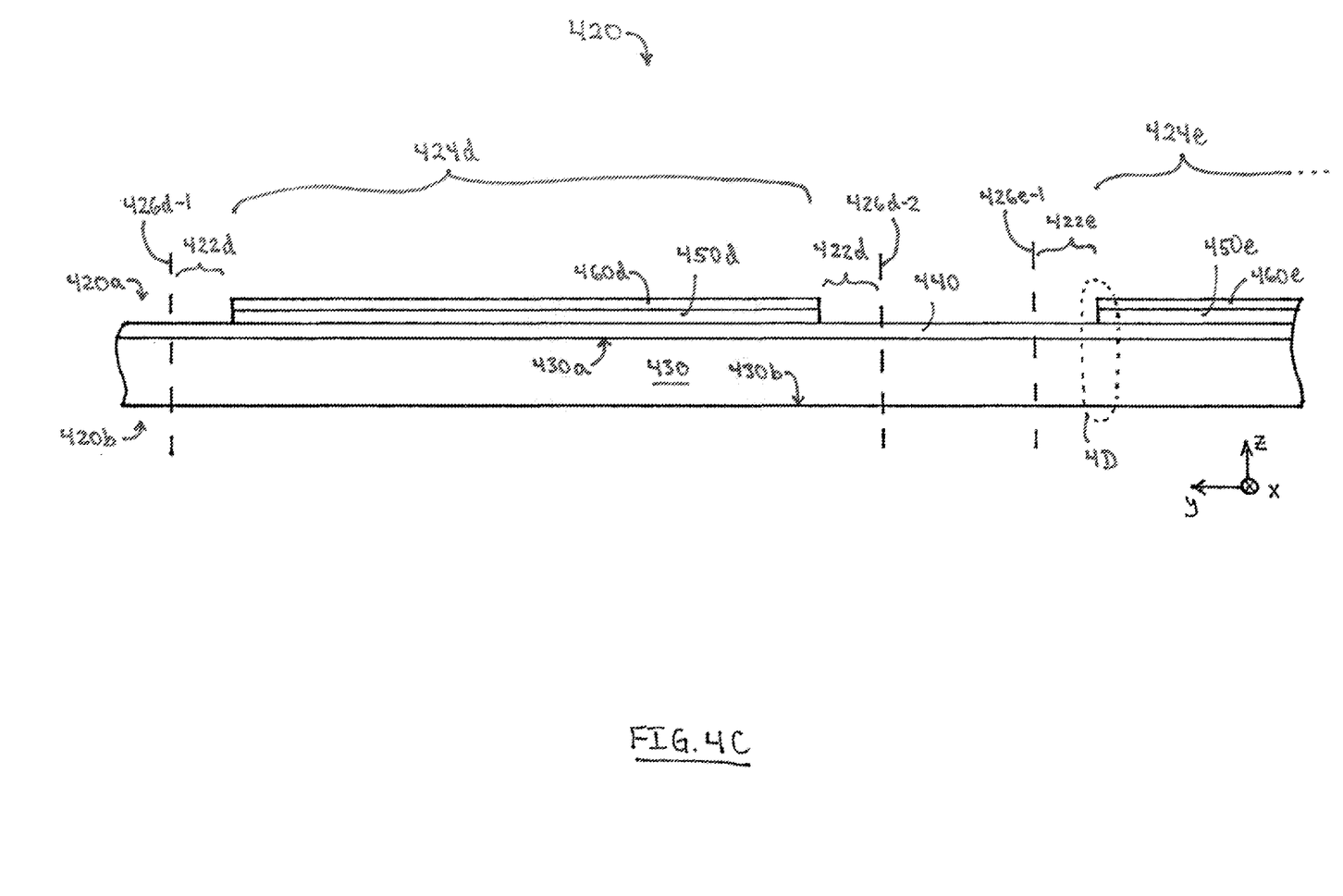
FIG. 4C is a schematic cross-sectional view through the line 4C-4C in FIGS. 4A and 4B.
Figure 4D:
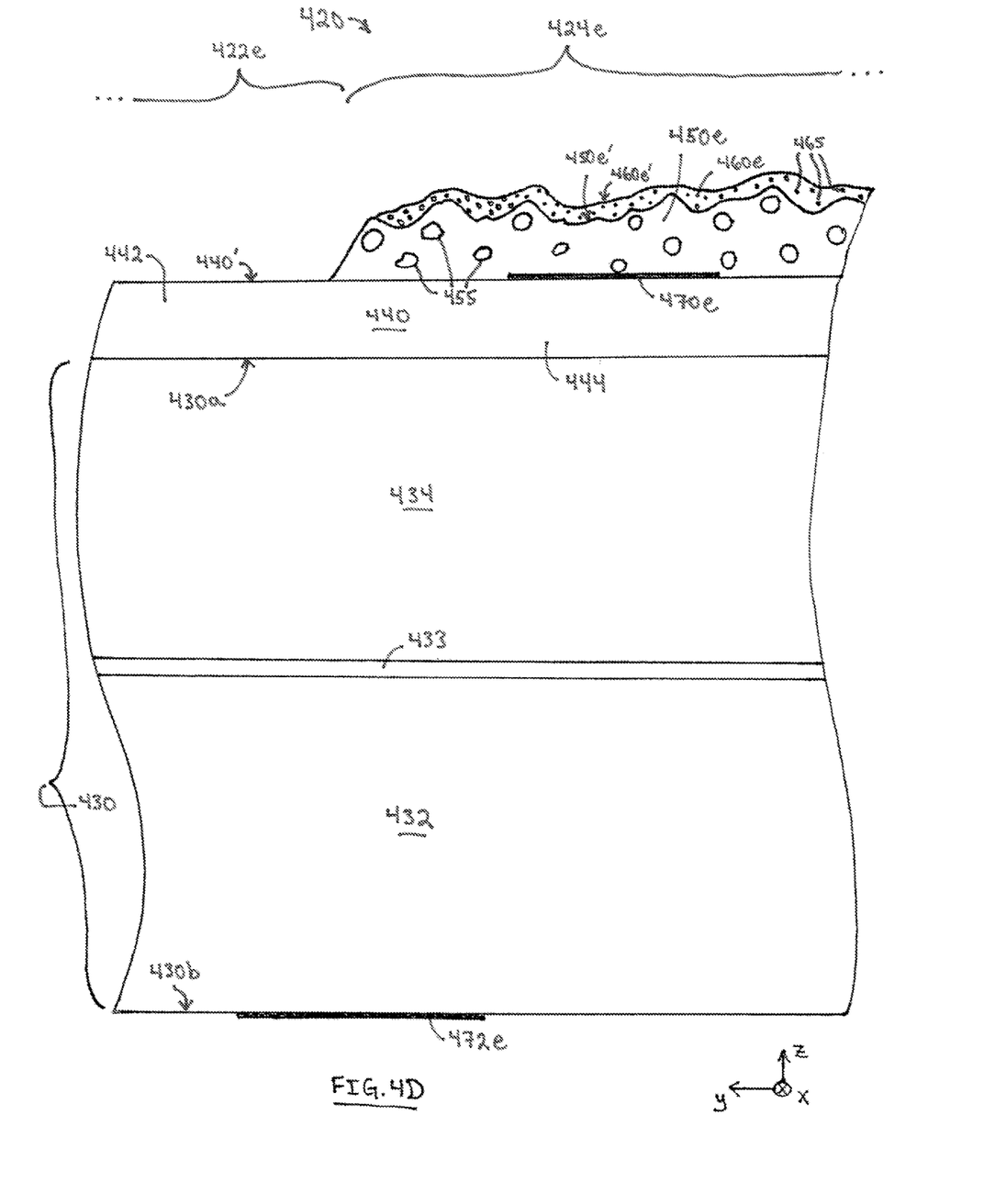
FIG. 4D is a magnified view of the lidding film of FIG. 4C in the region labeled "4D"

FIGS. 4A-4D are schematic views of another lidding film 420. These figures show the film 420 in the form of a continuous web or sheet, from which individual pieces may be cut. FIG. 4A is a perspective view of a first side 420a of the film 420, FIG. 4B is a perspective view of an opposed second side 420b of the film 420, FIG. 4C is a cross-sectional view of the film 420 through cut line 4C-4C (see FIGS. 4A, 4B), and FIG. 4D is a close-up of a part of FIG. 4C. For reference purposes and ease of description, the lidding film 420 is shown in the context of a Cartesian x-y-z coordinate, system. Furthermore. FIGS. 4A and 4B show the film 420 as having a physical edge 420c, with a reference line 418 passing through that edge.

Dashed boundary lines 426a, 426b, 426e, 426d, 426e, 426f, and 426g—each of which is visible from both sides 420a, 420b of the film 420—represent predefined paths along which individual pieces of the lidding film 420 can be cut. Each such path or piece has associated with it a peripheral region (422a, 422b, 422e, 422d, 422e, 422f, 422g) and a central region (424a, 424b, 424e, 424d, 424e, 424f, 424g), which for simplicity are shown to have regular, symmetrical, circular configurations similar to the embodiment of FIG. 2. The paths or pieces associated with boundary lines 426d and 426g are also shown as having first indicia 470d, 470g, which are visible from the first side 420a of the film 420 (FIG. 4A), as well as second indicia 472d, 472g, which are visible from the second side 420b of the film 420 (FIG. 4B). The first indicia 470d, 470g are shown in the figure as "INNER INDICIA" because this side 420a of the film 420 typically faces the cavity of the container, and the contents of the container, after sealing to the container rim in the peripheral region of the film 420. Thus, when a user opens the sealed container by peeling the piece of lidding film away from the container to access the package contents, the first indicia 470d or 470g ("INNER INDICIA") becomes visible to the user.

In contrast, the second indicia 472d, 472g are shown in FIG. 4B as "OUTER INDICIA" because this second side 420b of the film 420 typically faces outwardly, i.e., away from the container, cavity, and contents thereof, after the first side 420a of the film 420 is bonded and sealed to the container. Thus, before the user ever reaches to open the sealed container, the second indicia 472d or 472g ("OUTER INDICIA") is and remains visible to the user.

The basic construction of the lidding film 420 is revealed in the schematic cross-sectional view of FIG. 4C. The film 420 has opposed first and second sides 420a, 420b, respectively. We also see that the film 420 is made up of a substrate 430 on one side of which is provided a heat-sealing (HS) layer 440, a non-heat-sealing (NHS) layer (shown in two distinct parts—one NHS layer portion 450d and another NHS layer portion 450e, these portions collectively and individually referred to as an NHS layer), and a hydrophobic coating (also shown in two distinct parts—one hydrophobic coating portion 460d and another hydrophobic coating portion 460e, these portions collectively and individually referred to as a hydrophobic coating). Dashed lines 426d-1 and 426d-2 are portions of the boundary line 426d (see FIGS. 4A, 4B) that intersect the cross-sectional cut line 4C-4C, and dashed line 426e-1 is similarly a portion of the boundary line 426e (sec FIGS. 4A, 4B) that intersects the cut line. The lidding film 420 may include other layers or elements even though they are not shown in FIG. 4C, such as the first indicia 470d (FIG. 4A) and the second indicia 472d (FIG. 4B). In that regard, the first indicia 470d may be printed between the HS layer 440 and the NHS layer 450d, such that the NHS layer 450d covers and protects the printed first indicia. The second indicia 472d may be printed on the opposite side 420b of the lidding film 420, for example, directly on the second major surface 430b of the substrate 430, opposite the first outer major surface 430a on which the HS layer 440, the NHS layer, and the hydrophobic coating reside.

Besides the constituent layers already discussed, the lidding film 420 may include one or more additional layers, coatings, or other elements known to those skilled in the art, in order to provide one or more mechanical, chemical, or optical properties as desired.

The substrate 430 has first and second outer major surfaces 430a, 430b which correspond respectively to the first and second sides 420a, 420b of the lidding film 420. The HS layer 440, NHS layer 450d, 450e, and hydrophobic layer 460d, 460e are all disposed on the outer major surface 430a. In some cases, the substrate 430 may be the dominant mechanical component of the lidding film 420, from the standpoint of weight and thickness. That is, more than half of the weight of the lidding film 429, and more than half of the thickness of the lidding film 420, may be attributable to the substrate 430. In most cases, both the substrate 430 and the lidding film 420 are relatively thin and flexible, and each is robust enough to be processed on conventional web-handling equipment and wound up into a roll, if desired.

The substrate 430 may be of a single layer construction as shown in FIG. 4C, or it may have a multilayered construction. The composition of the substrate may comprise any one, or a combination, of the following materials: polymers, including thermoplastic polymers; metals; paper, or paperboard; and coextrusions or laminations of any of the foregoing. The substrate 430 may also include one or more functional layers such as: an adhesive layer; a print layer; and a barrier layer, whether coextruded or vapor deposited, and whether a barrier to moisture, oxygen, light, or other agents. The substrate may also have desirable deadfold properties, and may be scratch- or abuse-resistant. In one embodiment of interest, the substrate 430 may be a single-layer metal foil. In another embodiment of interest, the substrate 430 may be a paper layer laminated by a thin adhesive to a single layer of oriented polyethylene terephthalate OPET). The overall thickness or caliper of the substrate 430 is not limited, but is preferably in a range from 1 to 50 mils (0.025-13 mm) more preferably from 1 to 3 mils (0.025-0.076 mm).

The HS layer 440 may be made of any material capable of forming a leak-proof seal under specified heat seal conditions. Without wishing to be limited, the heat seal conditions may, as a non-limiting example, be characterized by heat seal temperature of 93-177° C. (200-350° F.), pressure of 172-310 kPa (25-45 psi) and dwell time of 0.5-1 second. Suitable materials for use as the HS layer 444) may include a thermoplastic polymer, or polymer composition comprising, from 20-100% of thermoplastic polymer(s), which polymer or polymer composition may be of a lacquer type, hot melt type, or extrudable type. The polymer, and therefore, the HS layer 440, may in some cases have a softening temperature in a range from 79-204° C. (175-400° F.). The 115 layer 440 may typically have a single layer construction for ease of manufacture, but multiple layers can be used in alternative embodiments. The overall thickness or caliper of the HS layer 440 is not limited, but is preferably in a range from 0.1 to 1.5 mils (0.0025-0.038 mm).

The NHS layer 450d, 450e may be made of any material suitable for use in lidding applications, provided the material is not adapted to form a seal during the operation used to heat seal the HS layer 440. The incapacity of the NHS layer to form a seal may be primarily a result of its position or configuration on the lidding film relative to a peripheral sealing, region, as described in greater detail throughout this document, but in some cases may also be influenced by the composition of the NHS layer. Suitable materials fir use as the NHS layer may include polymers or polymer compositions, where such polymer or polymer composition may be of a printed lacquer type, hot melt type, or extrudable type. The polymer, and therefore, the NHS layer, may have a softening temperature that differs from that of the HS layer, for example, it may be higher or lower. If the NHS layer has a higher softening temperature than that of the HS layer, the polymer and, therefore, the NHS layer, may in some cases have a softening temperature above 148° C. (300° F.) if the NHS layer has a higher softening temperature than that of the HS layer, the NHS layer may be able to withstand a broader range of processing conditions without forming a seal. In one embodiment of interest, the HS layer comprises a first lacquer, and the NHS layer comprises a second lacquer whose softening temperature is different than that of the first lacquer. The NHS layer may typically have a single layer construction for ease of manufacture, but multiple layers can be used in alternative embodiments. The overall thickness or caliper of the Ni IS layer is not limited, but is preferably less than 25 micrometers.

The NHS layer 450d, 450e may include one car more functional additives. One such additive comprises particles or beads dispersed throughout the layer. In embodiments of particular interest, such particles are selected to have diameters or sizes that are large enough to cause the outer major surface of the NHS layer to be roughened or textured. Hence, we refer to such particles as texturizing beads. The texturizing heads may for example have an average diameter in a range from 5-20 micrometers, and they may have a loading concentration in the NHS layer in a range from 1-80 wt % (dry weight), or more preferably from 3-50 wt % (dry weight). Texturing the surface of the NHS layer can be of particular benefit when a hydrophobic coating is used as an outermost layer of the lidding film 420, e.g., when the hydrophobic coating is applied to the (roughened surface of the) NHS layer. The roughened surface helps to maintain the integrity of the hydrophobic layer by protecting much of the hydrophobic coating from abrasion due to contact with rollers or other film-processing equipment during manufacture of the lidding film 420. Texturizing beads may comprise one or more of: oxides such as silicon oxide, aluminum oxide, zirconium oxide, titanium oxide, and iron oxide; inorganic salts; organic salts; glass; ceramics: acrylic resin; urethane resin; epoxy resin: polyethylene resin; polypropylene resin; polyamide resin; polytetrafluoroethylene resin; and otherwise as disclosed in U.S. Pat. No. 9,327,879 (Sekiguchi, et al.). By including the NHS layer in the lidding film 420, and by placing the texturizing beads in the NHS layer, it becomes feasible to substantially omit, or not include, any texturizing beads in the HS layer 440. This in turn makes it feasible to form the HS layer thinner than it would otherwise need to be, thus saving on material costs of the HS material, and furthermore it allows the portion of the HS layer at the peripheral region (where sealing to the rim of the container occurs) to be free of, or to at least have a reduced level of, extraneous additives that may impede the formation of a reliable heat seal in that region.

In alternative embodiments, texturing of the major surface of the NHS layer may be made by embossing such surface, or by a combination of embossing the surface and including texturizing beads in the NHS layer. In still other embodiments, the NHS layer may utilize neither embossing nor texturizing beads, and the major surface of the NHS layer, as well as the hydrophobic layer, may be substantially smooth and non-textured.

The hydrophobic coating 460d, 460e may be made of any suitable hydrophobic material. Typical materials comprise microscopic structures formed of hydrophobic particles. The hydrophobic particles are characteristically substantially smaller than the texturizing beads discussed above. For example, the hydrophobic particles may have an average diameter in a range from 3 to 100 nanometers. A hydrophobic coating can be made with such particles by coating, painting, or otherwise applying a dispersion of the hydrophobic particles in a suitable solvent (e.g., water or ethanol), and then driving off the solvent in a drying procedure. Suitable materials for use as the hydrophobic particles (and hydrophobic coating) may include one or more of silica (silicon dioxide), alumina, and titania. In some cases, it is helpful to surface treat such particles with a silane coupling agent or other suitable agent to create or enhance hydrophobic characteristics. Some commercially available hydrophobic particles include: for silica, Aerosil R972, Aerosil R972V, Aerosil R972CF, Aerosil R974, Aerosil RX200 and Aerosil RY200 (Japan Aerosil) and Aerosil 8202, Aerosil 8805, Aerosil R812 and Aerosil R8125 (Evonik Degussa); for titania, Aeroxide Ti02 T805 (Evonik Degussa); for alumina, Aeroxide Alu C (Evonik Degussa) that have been surface treated with a silane coupling agent. By appropriate selection and processing, the hydrophobic coating can be made to be ultrahydrophobic, i.e., having a characteristic contact angle of at least 120 degrees, or superhydrophobic, having a characteristic contact angle of at least 150 degrees.

The overall thickness or caliper of the hydrophobic coating 460d, 460e is not limited, but is preferably characterized by a mass per unit area in a range from 0.01 to 10 g/m$^2$.

The layers and coatings 440, 450d, 450e, 460d, and 460e may be applied to the substrate 430 using any suitable manufacturing techniques, including but not limited to laminating, spray coating, roll coating, flex coating, gravure coating, extrusion coating, solvent coating, and the like. In the embodiment of FIG. 4C, the HS layer 440 is not patterned but is instead substantially coextensive with the outer major surface 439a of the substrate, and the NHS layer 450d is patterned such that it fills the central region 424d but is absent from the peripheral region 422d. A portion of the HS layer 440 fills the peripheral region 422d, and the NHS layer 450d is absent as a cover on (and does not cover) the HS layer in such region 422d. The NHS layer 450d fills the central region 424d, and the HS layer 440 is absent as a cover on (and does not cover) the NHS layer 450d in such region 424d. Furthermore, the hydrophobic coating 460d is patterned and in substantial registration with the NHS layer 450d. The hydrophobic coating 460d repels not only water but any water-based product, including yogurt, that resides within the sealed container (see FIG. 5B below) such that the inner indicia 470d (see FIG. 4A), which is also located in the central region 424d hut beneath (covered by) the hydrophobic coating, remains unobstructed and easily seen by a user alter breaking the seal and removing the lidding film 420 from the container. The absence of the hydrophobic coating in the peripheral region allows the HS layer 440 to be free of, or to at least have a reduced level of, extraneous additives that may impede the formation of a reliable heat seal.

Alternative patterning and layering arrangements of the HS layer, the NHS layer, and the hydrophobic coating are also contemplated, and are discussed further below.

Turning now to FIG. 4D, we see there a detail of the lidding film 420 in the area marked as 4D in FIG. 4C. In this figure, like reference numbers refer to like elements, and elements previously introduced win not be discussed again to avoid needless repetition.

FIG. 4D incorporates several differences relative to FIGS. 4A-4C for descriptive and illustrative purposes. One such difference involves the substrate 430. Unlike in FIG. 4C, the substrate 430 in FIG. 4D is shown as being multi layer in construction, having a first layer 432 laminated to a second layer 434 by a thin adhesive layer 433. In one embodiment of interest, the first layer 432 may be a layer of paper, and the second layer 434 may be a layer of OPET, or of another suitable polymer material. Another difference is the addition of a first indicia 470e in the central region 424e, and the addition of a second indicia 472e on the outer major surface 430b of the substrate 430. The first indicia 470e may be the same as or similar to the first indicia 470d, 470g seen in FIG. 4A (visible from the first side 420a of the lidding film), and the second indicia 472e may be the same as or similar to the second indicia 472d, 472g seen in FIG. 4B (visible from the second side 420b of the lidding film). FIG. 4D is also large enough to show details of the layers 450e, 460e that were not shown in FIG. 4C, in particular: the NHS layer 450e is shown to contain texturizing beads 455, and the outer major surface 450e' of the NHS layer 450e is shown to be textured or roughened; and the hydrophobic coating 460e is shown to have a textured or roughened major surface 460e similar to the textured surface 450e', the hydrophobic coating 460e also being shown to comprise hydrophobic particles 465. The HS layer 440 is shown to have a first portion 442 disposed in the peripheral region 422e and a second portion 444 disposed in the central region 424e. The outer major surface of the HS layer 440 is labeled 440'.

Figure 5A:
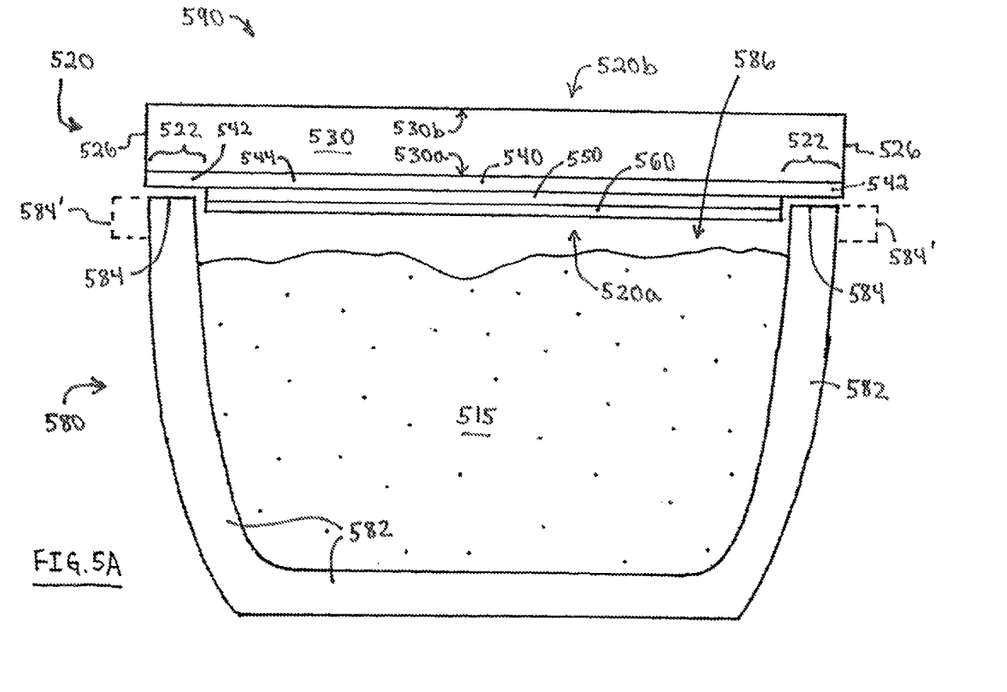
FIG. 5A is a schematic cross-sectional view of a package in which a lidding film is about to be sealed to a container.
Figure 5B:
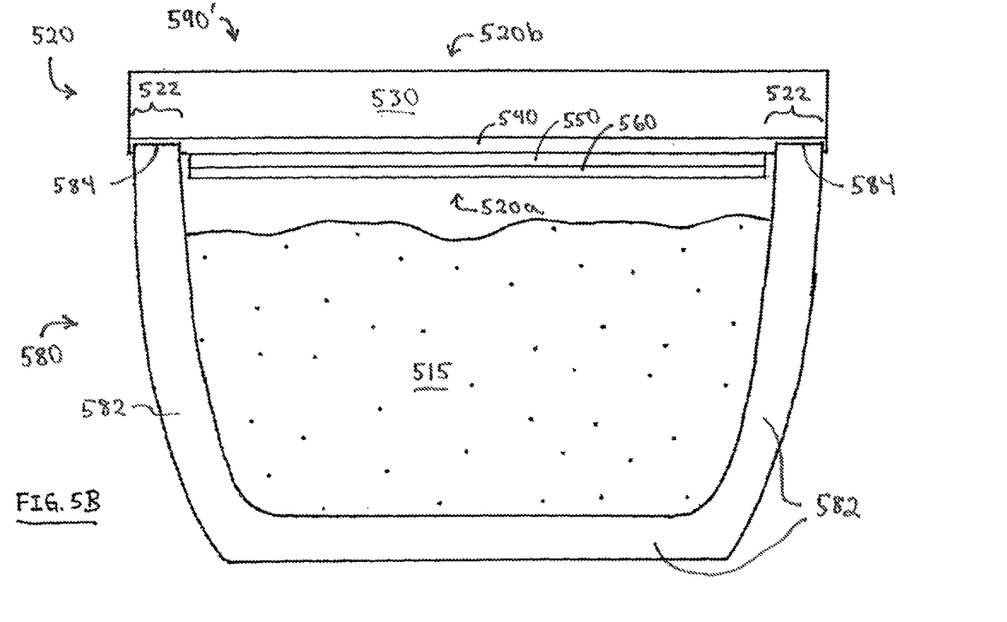
FIG. 5B is a schematic cross-sectional view of the package of FIG. 5A after the sealing procedure.

Turning now to FIGS. 5A and 5B, we see there illustrations of a lidding film 520 as disclosed herein being combined with a container 580 to form a package 590 or sealed package 590'.

The lidding film 520 has a first side 520a and a second side 520b, and comprises a substrate 530 having outer major surfaces 530a, 530b, The film 520 has been cut from a larger web or sheet to define a boundary or edge 526. Disposed on the major surface 530a is an HS layer 540, an NHS layer 550, and a hydrophobic coating 560. The HS layer 540 is substantially coextensive with the outer major surface 530a of the substrate, and the NUS layer 550 is patterned such that it fills a central region (not labeled in FIG. 5A, but substantially the same as the central region 424d in FIG. 4C) but is absent from a peripheral region 522. A first portion 542 of the HS layer 540 fills the peripheral region 522, and the NHS layer 550 is absent as a cover on (and does not cover) the HS layer in such region 522. The NHS layer 550 fills the central region, and the HS layer 540, with second portion 544 in the central region, is absent as a cover on (and does not cover) the NHS layer 550 in such region. Furthermore, the hydrophobic coating 560 is patterned and in substantial registration with the NHS layer 550. The foregoing features and aspects of the lidding film 520 may be the same as or similar to any of the corresponding features and aspects discussed above in connection with other lidding films.

The lidding film 520 is in close proximity to the opening of a container 580 to provide, in combination, a package 590. The container 580 comprises walls 582 that are shaped to provide sidewalls and a base in the form of a cup, tub, bowl, or the like. The walls 582 form a cavity 586, the opening of which is encircled by a rim 584 of the container 580. In some embodiments the rim 584 may be flared to form a flange 584' to provide an increased scaling area. The container 580 may be made of any suitable material capable of forming an attachment to the HS layer by heat sealing. Exemplary materials may include but are not limited to one or more of polyester, polypropylene, polystyrene, polyethylene, polyvinyl chloride, paperboard, metal, and other materials known in the packaging arts. The walls of the container 580 may be thicker, or may otherwise have a greater rigidity or stiffness, than the lidding film 520, to maintain the container's shape and integrity.

Before covering the opening with the lidding film 520, the cavity 586 is charged with a product 515, for example, yogurt, or another water-based semi-solid food or non-food product. The lidding film 520 and the container 580 are mutually configured such that the rim 584 has a shape (in the plane of the lidding film 520) that matches or at least overlaps with the shape of the peripheral region 522. In a simple example, these shapes may be circular rings of the same or similar dimensions. In any case, the lidding film 520 can be aligned with and pressed against the container 580 so the peripheral region 522 of the lidding film makes contact with and along the rim 584. The area of contact is then heated in accordance with specified heat seal conditions, e.g. by application of a controlled amount of ultrasonic energy, or by heat conduction or by other known means, so that the HS layer 540 melts or softens to form a heat seal and bond between the lidding film 520 and the container 580. The result is the sealed package 590' of FIG. 5B.

In some cases, a sheet of lidding film, such as that shown in FIGS. 4A-4B, may be heat-sealed to a suitably configured cluster of containers (whether cups, tubs, or howls) in a manner completely analogous to the single-container example of FIGS. 5A-5B, but in a way that produces a multiplicity of sealed packages substantially simultaneously.

Many useful variations of the disclosed lidding films can be made by changing the patterning, layering, or other configuration of the constituent layers and coatings of the lidding film. FIGS. 6 through 10 depict some of these variations as they relate to the arrangement of the HS layer and NHS layer. Although a hydrophobic coating would normally be included in these embodiments, no hydrophobic coating is shown in these figures for simplicity and ease of illustrating the relationships between the HS and NHS layers. Similarly, although no inner or outer indicia layers are shown, these too may be included in these embodiments in accordance with the teachings herein. Individual elements in these FIGS. 6-10 can be the same as or similar to corresponding elements described above, except as otherwise indicated.

Figure 6:
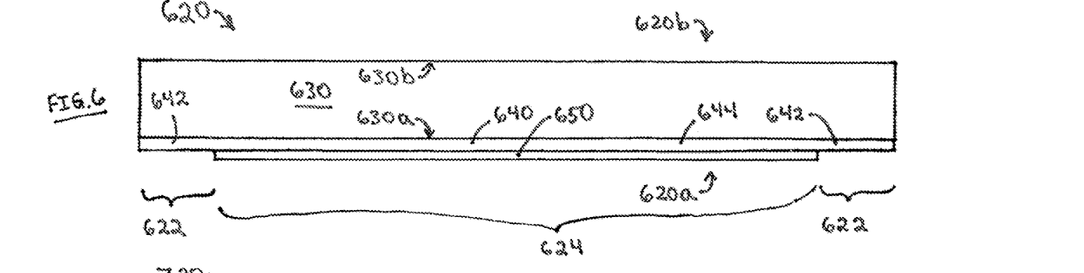
FIGS. 6 through 10 are schematic side or sectional views of various lidding film configurations, but where the hydrophobic coating is not shown for simplicity and ease of illustrating relationships between other elements of the lidding film.

In FIG. 6, a lidding film 620 has first and second sides 620a, 620b, and includes a substrate 630 having outer major surfaces 630a, 630b. An HS layer 640, an NHS layer 650, and a hydrophobic coating (not shown) are disposed on the surface 630a. We define a peripheral region 622 that encircles a central region 624 of the lidding film. A first portion 642 of the HS layer fills the peripheral region 622, and the NHS layer is absent as a cover on (and does not cover) the HS layer in this region. The NHS layer fills the central region 624, and the HS layer, with second portion 644 in central region 624, is absent as a cover on (and does not cover) the NHS layer in this region. At least a portion of the hydrophobic coating (not shown) covers at least part of the NHS layer in the central region. The arrangement of the HS and NHS layers in this FIG. 6 is similar to that of FIGS. 4C, 5A, and 5B. The HS layer 640 is substantially coextensive with the major surface 630a, and the NHS layer 650 is patterned.

Figure 7:
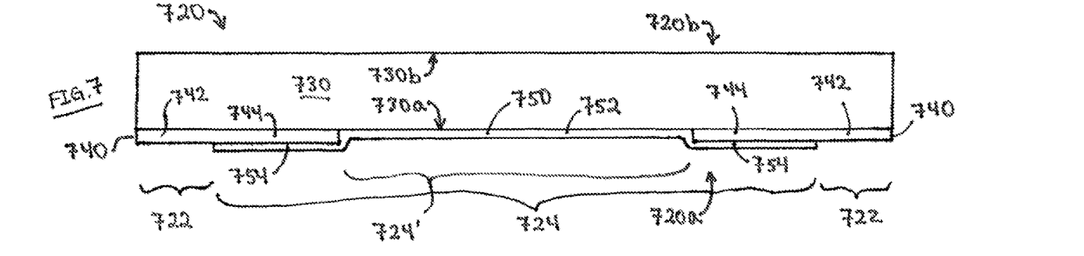

In FIG. 7, a lidding film 720 has first and second sides 7200, 720b and includes a substrate 730 having outer major surfaces 730a, 730b. An HS layer 740, an NHS layer 750, (with first portion 752 and second portion 754) and a hydrophobic coating (not shown) are disposed on the surface 730a. We define a peripheral region 722 that encircles a first central region 724 and a second central region 724' of the lidding film. A portion 742 of the HS layer fills the peripheral region 722, and the NHS layer is absent as a cover on (and does not cover) the HS layer in this region. The NHS layer fills both of the central regions 724, 724', and the HS layer, with second portion 744 in central region 724, is absent as a cover on (and does not cover) the NHS layer in these regions. At least a portion of the hydrophobic coating (not shown) covers at least part of the NHS layer in at least one of the central regions. The HS layer 740 and the MIS layer 750 are both patterned, and overlap (see second portion 744 of the HS layer and second portion 754 of the NHS layer) in a region between the peripheral region 722 and the second central region 724'.

Figure 8:
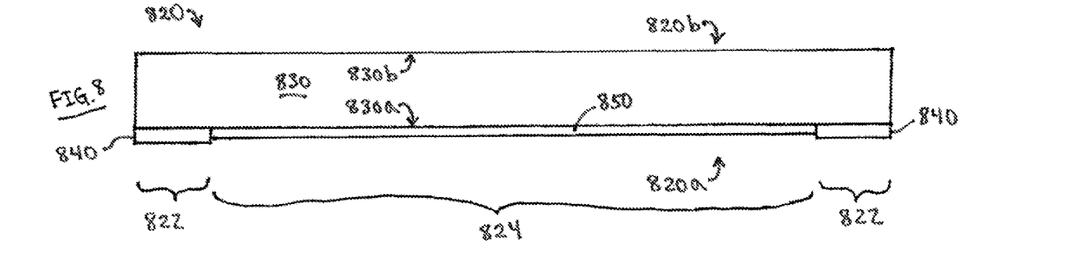

In FIG. 8, a lidding film 820 has first and second sides 820a, 820b, and includes a substrate 830 having outer major surfaces 830a, 830b. An HS layer 840, an NHS layer 850, and a hydrophobic coating (not shown) are disposed on the surface 830a. We define a peripheral region 822 that encircles a central region 824 of the lidding film. The HS layer fills the peripheral region 822, and the NHS layer is absent as a cover on (and does not cover) the HS layer in this region. The NHS layer fills the central region 824, and the HS layer is absent as a cover on (and does not cover) the NHS layer in this region. At least a portion of the hydrophobic coating (not shown) covers at least part of the NHS layer in the central region. The HS layer 840 and the NHS layer 850 are both patterned, but do not overlap.

Figure 9:
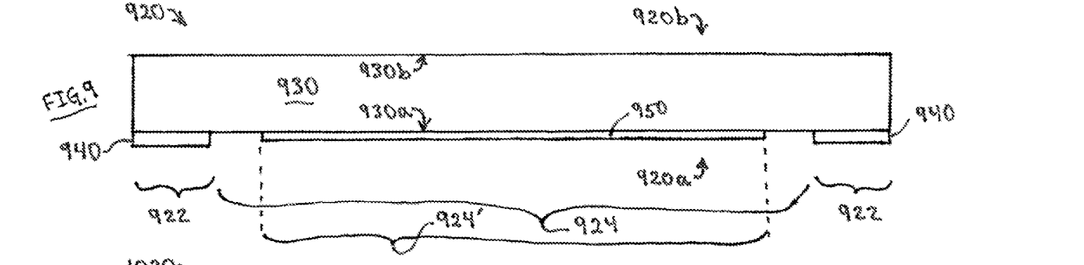

In FIG. 9, a lidding film 920 has first and second sides 920a, 920b, and includes a substrate 930 having outer major surfaces 930a, 930b. An HS layer 940, an NHS layer 950, and a hydrophobic coating (not shown) are disposed on the surface 930a. We define a peripheral region 922 that encircles a first central region 924 and a second central region 924' of the lidding film. The HS layer fills the peripheral region 922, and the NHS layer is absent as a cover on (and does not cover) the HS layer in this region. The NHS layer fills the second central region 924', and the HS layer is absent as a cover on (and does not cover) the NHS layer in this region. At least a portion of the hydrophobic coating (not shown) covers at least part of the MIS layer in this second central region. The HS layer 940 and the NHS layer 950 are both patterned, but do not overlap.

Figure 10:
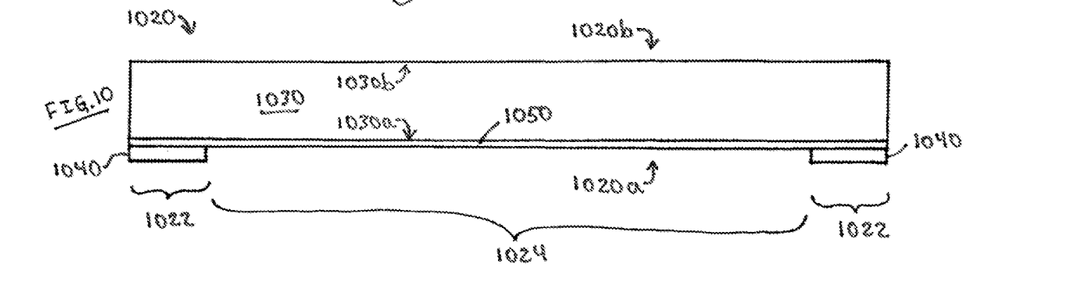

In FIG. 10, a lidding film 1020 has first and second sides 1020a, 1020b, and includes a substrate 1030 having outer major surfaces 103k, 1030b. An HS layer 1040, an NHS layer 1050, and a hydrophobic coating (not shown) are disposed on the surface 1030a. We define a peripheral region 1022 that encircles a central region 1024 of the lidding film. The HS layer fills the peripheral region 1022, and the NHS layer is absent as a cover on (and does not cover) the HS layer in this region. The NHS layer fills the central region 1024, and the HS layer is absent as a cover on (and does not cover) the NHS layer in this region. At least a portion of the hydrophobic coating (not shown) covers at least part of the NHS layer in the central region. The NHS layer 1050 is substantially coextensive with the major surface 1030a, and the HS layer 1040 is patterned.

Figure 11:
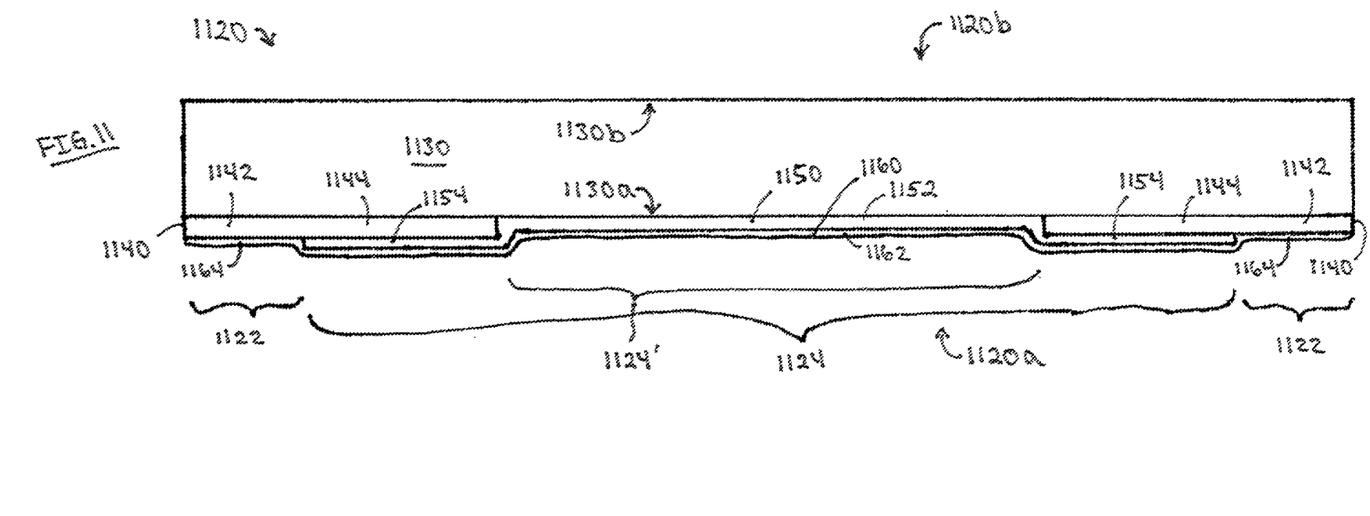
FIG. 11 is a schematic side or sectional view of a lidding film similar to that of FIG. 7, tart where a particular hydrophobic; coating configuration is illustrated.
Figure 12:
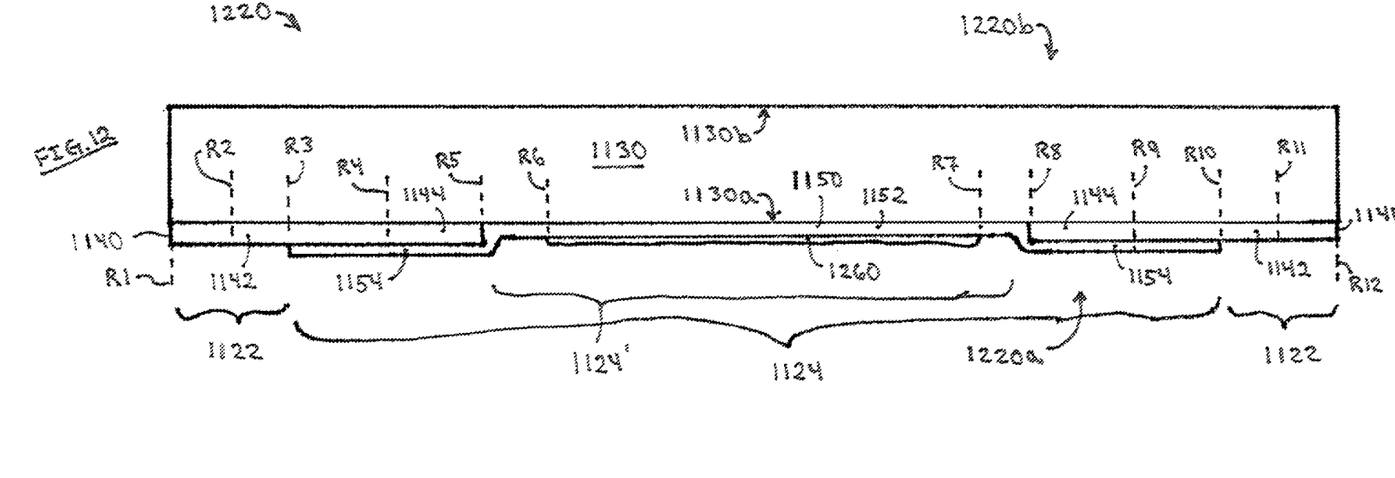
FIG. 12 is a schematic side or sectional view of a lidding film similar to that of FIG. 11, but where an alternative hydrophobic coating configuration is illustrated.

FIGS. 11 and 12 illustrate some of the many possible configurations of the hydrophobic coating for the lidding film embodiment shown in FIG. 7, which configurations are also applicable to other lidding film embodiments disclosed herein. Individual elements in the FIGS. 11-12 can be the same as or similar to corresponding elements described above, except as otherwise indicated.

In FIG. 11, a lidding, film 1120 has first and second sides 1120a, 1120b, and includes a substrate 1130 having outer major surfaces 1130a, 1130b. An HS layer 1140, an NHS layer 1150 (with first portion 1152 and second portion 1154), and a hydrophobic coating 1160 are disposed on the surface 1130a. We define a peripheral region 1122 that encircles a first central region 1124 and a second central region 1124' of the lidding film. A portion 1142 of the HS layer fills the peripheral region 1122, and the NHS layer is absent as a cover on (and does not cover) the layer in this region. The NHS layer fills both of the central regions 1124, 1124', and the HS layer, with second portion 1144 in central region 1124, is absent as a cover on (and does not cover) the NHS layer in these regions. At least a portion of the hydrophobic coating (see portion 1162) covers at least part of the NHS layer in both of the central regions. Another portion 1164 of the hydrophobic coating covers the HS layer in the peripheral region. The HS layer 1140 and the NHS layer 1150 are both patterned, and overlap (see second portion 1144 of the HS layer and second portion 1154 of the NHS layer) in a region between the peripheral region 1122 and the second central region 1124'.

FIG. 12 shows a lidding film 1220 that may be the same as the lidding film 1120, except that the hydrophobic layer has been reduced in size to the hydrophobic layer 1260 shown in the figure. Reference lines R1 through R12 are included in the figure to assist in the description of alternative configurations of the hydrophobic layer. For example, reference lines R6 and R7 show the extent of the hydrophobic layer 1260, which covers only a portion of the MIS layer in the central region 1124', but which can still be useful to keep yogurt or other contained product off of that portion of the central region 1124'. In an alternative configuration, the hydrophobic layer can be expanded to extend from reference line R5 to reference line R8. In this configuration, the hydrophobic layer covers the MIS layer in the central region 1124' but not outside that region. In other configurations, the hydrophobic layer can be expanded to extend from reference line R4 to reference line R9, or from reference line R3 to R10, or from R2 to R11, or finally from R1 to R12, which corresponds to the embodiment of FIG. 11.

The lidding films of FIGS. 6-12 can each be combined with a suitable container to provide a sealed package in an analogous manner to the description of FIGS. 5A-5B.

Example

Using a conventional roll-to-roll solvent based adhesive laminating process, a multilayered substrate was prepared using 26.4 lb/rm paper (Gerbier OPCL) and metalized 48 ga oriented PET (OPET). Specifically, the uncoated side of the paper and the non-metalized side of the metalized OPET were bonded using a two-component polyurethane-based adhesive (1.8 lb/rm dry weight, Tycel 7900 adhesive plus Tycel 7283 curing agent, available from Henkel Corp.). This yielded a multilayered substrate similar to the substrate 430 shown in FIG. 4D, but where layer 432 represents the paper (coated side out), layer 433 represents the adhesive, and layer 434 represents the metalized OPET (metalized side out).

An HS layer was then applied to the entire (metalized) outer major surface corresponding to surface 430a in FIG. 4D. This was done by applying a flood coat of a heat seal coating (2.3 lb/rm dry weight, ACTEseal HSC-274 available from Actega Coatings and Sealants) to the (metalized) outer major surface of the substrate.

First indicia in the form of graphics were then printed onto the opposite outer major surface of the substrate, i.e. on the paper side of the substrate corresponding to the surface 430b in FIG. 4O. This printing utilized a rotogravure process. After printing, the first indicia (see element 472e in FIG. 4D) was then overcoated with a protective overlacquer layer (OL).

Three additional materials, corresponding to a second indicia layer (see element 470e in FIG. 4D), an NHS layer (see element 450e in FIG. 4D), and a hydrophobic coating (see element 460e in FIG. 4D) were register printed on the exposed surface of the HS layer via a rotogravure process. First, a blend of HSC-27 and black pigment was used to register print a graphic message directly on the surface of the HS layer to form the second indicia layer. Next, the NHS layer was made to cover the second indicia layer using a layer of over lacquer that contained texturizing beads (see elements 455 in FIG. 4D). The overlacquer wet solution was 100 parts nitrocellulose overlacquer (available from SUB Chemical), 50 parts ethyl acetate, and 10 parts crosslinked polymethyl methacrylate beads (Spheromers® CA10 available from Microbeads®). This, after drying, produced the NHS layer with a textured surface (see elements 450e, 450e' in FIG. 4D). Finally, a registered layer of silica ethanol solution was applied. This solution was blended using a 10% silica ethanol solution (available from Wikoff Color Corporation) diluted with water to 5% solids. The silica was applied to 0.3 lb/rm dry weight. This, after drying, produced the hydrophobic coating (see element 460e in FIG. 4D), and the finished lidding film.

Unless otherwise indicated, all numbers expressing feature sizes, amounts, ranges, limits, and physical and other properties used in the specification and claims are to be understood as being modified in all instances by the term "about". Accordingly, unless indicated to the contrary, the numerical parameters set forth in the specification and claims are approximations that can vary depending on the desired properties sought to be obtained by those skilled in the art utilizing the teachings disclosed herein.

As used in this specification and the appended claims, the singular forms "a," "an," and the encompass embodiments having plural referents, unless the context clearly dictates otherwise. As used in this specification and the appended claims, the term "or" is generally employed in its sense including "and/or" unless the context clearly dictates otherwise.

Spatially related terms, including but not limited to, "lower," "upper," "beneath," "below," "above," and "on top," if used herein, are utilized for ease of description to describe spatial relationships of an elements) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

When a given element (including one or more elements, components, layers, or the like) is described as being "on," "connected to," "coupled to," or "attached to" another element (including one or more elements, components, layers, or the like), the given element can be directly on, directly connected to, directly coupled to, or directly attached to such other element, or an intervening element (including one or more elements, components, layers, or the like) may be interposed between the given element and the other element. When the given element is referred to as being "directly on," "directly connected to," "directly coupled to," "directly attached to," or "in contact with" the other element, there are no, or substantially no, intervening elements.

Various modifications of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All patents, patent application publications, and other patent and non-patent documents referred to herein are incorporated by reference in their entireties to the extent they do not contradict the foregoing disclosure.

This application discloses a variety of items relating to lidding films and related packaging. These include, but are not limited to, the numbered items below.

Item 1 is a lidding film having on one side thereof a peripheral region that encircles a central region, the lidding film comprising:

a substrate having an outer major surface on which is disposed at least a heat-sealing layer (HS layer), a non-heat-sealing layer (NHS layer), and a hydrophobic coating;

wherein at least a first portion of the HS layer fills the peripheral region, and the NHS layer is absent as a cover on the HS layer in the peripheral region;

wherein at least a first portion of the NHS layer fills the central region, and the HS layer is absent as a cover on the NHS layer in the central region; and wherein at least a first portion of the hydrophobic coating covers at least part of the first portion of the NHS layer in the central region.

Item 2 is the film of item 1, wherein the NHS layer is patterned such that it fills the central region but is absent from the peripheral region, and the HS layer is substantially coextensive with the outer major surface, the HS layer being located between the substrate and the NHS layer.

Item 3 is the film of item 1, wherein the HS layer is patterned such that it fills the peripheral region but is absent from the central region, and the NHS layer is substantially coextensive with the outer major surface, the NHS layer being located between the substrate and the HS layer.

Item 4 is the film of item 1, wherein the NHS layer is patterned such that it fills the central region but is absent from the peripheral region, and the HS layer is patterned such that it fills the peripheral region but is absent from the central region.

Item 5 is the film of item 4, wherein the NHS layer and the HS layer overlap in an intermediate region between the peripheral region and the central region.

Item 6 is the film of item 1, wherein the hydrophobic coating contacts both the HS layer and the NHS layer.

Item 7 is the film of item 6, wherein the hydrophobic coating contacts substantially all of the NHS layer.

Item 8 is the film of item 1, wherein the hydrophobic coating contacts the NHS layer but does not contact the HS layer.

Item 9 is the film of item 8, wherein the hydrophobic coating contacts less than all of the NHS layer.

Item 10 is the film of item 8, wherein the hydrophobic coating contacts substantially all of the NHS layer.

Item 11 is the film of item 8, wherein the hydrophobic coating is patterned and in substantial registration with the NHS layer.

Item 12 is the film of any of items 1-11, wherein the HS layer comprises a first lacquer, the NHS layer comprises a second lacquer, and the second lacquer has a softening temperature different than that of the first lacquer.

Item 13 is the film of any of items 1-12, wherein the NHS layer comprises a textured surface.

Item 14 is the film of any of items 1-13, wherein the hydrophobic coating is ultrahydrophobic, having a contact angle of at least 150 degrees.

Item 15 is the film of any of items 1-14, wherein the hydrophobic coating is superhydrophobic, having a contact angle of at least 150 degrees.

Item 16 is the film of any of items 1-15, wherein the film further comprises:
a first indicia layer disposed between the HS layer and the NHS layer such that the first indicia layer is viewable from the one side of the lidding film.

Item 17 is the film of any of items 1-16, wherein the outer major surface is a first major surface of the substrate opposite a second major surface of the substrate, the film further comprising:
a second indicia layer disposed on the second major surface of the substrate and viewable from a second side of the lidding film.

Item 18 is the film of any of items 1-17, wherein the film forms a web for which the peripheral region is one of a plurality of peripheral regions and the central region is one of a plurality of central regions, each of the peripheral regions encircling a respective one of the central regions.

Item 19 is a package, comprising:
a container defining a product cavity, the container comprising a rim; and
a lidding film having on one side thereof a peripheral region that encircles a central region, the lidding film including:
  a substrate having an outer major surface on which is disposed at least a heat-sealing layer (HS layer), a non-heat-sealing layer (NHS layer), and a hydrophobic coating;
wherein at least a first portion of the HS layer fills the peripheral region and sealably contacts the rim, and the NHS layer is absent as a cover on the HS layer in the peripheral region;
wherein at least a first portion of the NHS layer fills the central region, and the HS layer is absent as a cover on the NHS layer in the central region; and
wherein at least a first portion of the hydrophobic coating covers at least part of the first portion of the NHS layer in the central region.

Item 20 is the package of item 19, wherein the rim of the container comprises a flange.

Item 21 is the package of item 19, wherein the NHS layer is patterned such that it fills the central region but is absent from the peripheral region, and the HS layer is substantially coextensive with the outer major surface, the HS layer being located between the substrate and the NHS layer.

Item 22 is the package of item 19, wherein the HS layer is patterned such that it fills the peripheral region but is absent from the central region, and the NHS layer is substantially coextensive with the outer major surface, the NHS layer being located between the substrate and the HS layer.

Item 23 is the package of item 19, wherein the NHS layer is patterned such that it fills the central region but is absent from the peripheral region, and the HS layer is patterned such that it fills the peripheral region but is absent from the central region.

Item 24 is the package of item 23, wherein the NHS layer and the HS layer overlap in an intermediate region between the peripheral region and the central region.

Item 25 is the package of item 19, wherein the hydrophobic coating contacts both the HS layer and the NHS layer.

Item 26 is the package of item 25, wherein the hydrophobic coating contacts substantially all of the NHS layer.

Item 27 is the package of item 19, wherein the hydrophobic coating contacts the NHS layer but does not contact the HS layer.

Item 28 is the package of item 27, wherein the hydrophobic coating contacts less than all of the NHS layer.

Item 29 is the package of item 27, wherein the hydrophobic coating contacts substantially all of the NHS layer.

Item 30 is the package of item 27, wherein the hydrophobic coating is patterned and in substantial registration with the NHS layer.

Item 31 is the package of any of items 19-30, wherein the HS layer comprises a first lacquer, the NHS layer comprises a second lacquer, and the second lacquer has a softening temperature different than that of the first lacquer.

Item 32 is the package of any of items 19-31, wherein the NHS layer comprises a textured surface.

Item 33 is the package of any of items 19-32, wherein the hydrophobic coating is ultrahydrophobic, having a contact angle of at least 120 degrees.

Item 34 is the package of any of items 19-33, wherein the hydrophobic coating is superhydrophobic, having a contact angle of at least 150 degrees.

Item 35 is the package of any of items 19-34, wherein the lidding film further comprises:
  a first indicia layer disposed between the HS layer and the NHS layer such that the first indicia layer is viewable from the one side of the lidding film.

Item 36 is the package of any of items 19-35, wherein the outer major surface is a first major surface of the substrate opposite a second major surface of the substrate, the lidding film further comprising:
  a second indicia layer disposed on the second major surface of the substrate and viewable from a second side of the lidding film.

Item 37 is the film of item 1 or the package of item 19, wherein the NHS layer comprises texturizing, beads.

Item 38 is the film of item 1 or the package of item 19, wherein the NHS layer comprises texturizing beads, and the HS layer is substantially devoid of texturizing beads.

The invention claimed is:
1. A lidding film having on one side thereof a peripheral region that encircles a central region, the lidding film comprising:
   a substrate having an outer major surface on which is disposed at least a heat-sealing layer (HS layer), a non-heat-sealing layer (NHS layer), and a hydrophobic coating;

wherein at least a first portion of the HS layer fills the peripheral region, and the NHS layer is absent as a cover on the HS layer in the peripheral region;

wherein at least a first portion of the NHS layer fills the central region, and the HS layer is absent as a cover on the NHS layer in the central region;

wherein at least a first portion of the hydrophobic coating covers at least part of the first portion of the NHS layer in the central region; and wherein the HS layer comprises a first lacquer, the NHS layer comprises a second lacquer, and the second lacquer has a softening temperature different than that of the first lacquer.

2. The film of claim 1, wherein the NHS layer is patterned such that it fills the central region but is absent from the peripheral region, and the HS layer is substantially coextensive with the outer major surface, the HS layer being located between the substrate and the NHS layer.

3. The film of claim 1, wherein the hydrophobic coating contacts both the HS layer and the NHS layer.

4. The film of claim 3, wherein the hydrophobic coating contacts substantially all of the NHS layer.

5. The film of claim 1, wherein the hydrophobic coating contacts the NHS layer but does not contact the HS layer.

6. The film of claim 5, wherein the hydrophobic coating contacts less than all of the NHS layer.

7. The film of claim 5, wherein the hydrophobic coating contacts substantially all of the NHS layer.

8. The film of claim 5, wherein the hydrophobic coating is patterned and in substantial registration with the NHS layer.

9. The film of claim 1, wherein the NHS layer comprises a textured surface.

10. The film of claim 1, wherein the hydrophobic coating is ultrahydrophobic, having a contact angle of at least 120 degrees.

11. The film of claim 1, wherein the hydrophobic coating is superhydrophobic, having a contact angle of at least 150 degrees.

12. The film of claim 1, wherein the film further comprises:
an inner indicia layer disposed between the HS layer and the NHS layer such that the inner indicia layer is viewable from the one side of the lidding film.

13. The film of claim 1, wherein the outer major surface is a first major surface of the substrate opposite a second major surface of the substrate, the film further comprising:
an outer indicia layer disposed on the second major surface of the substrate and viewable from a second side of the lidding film.

14. The film of claim 1, wherein the film forms a web for which the peripheral region is one of a plurality of peripheral regions and the central region is one of a plurality of central regions, each of the peripheral regions encircling a respective one of the central regions.

15. A lidding film having on one side thereof a peripheral region that encircles a central region, the lidding film comprising:
a substrate having an outer major surface on which is disposed at least a heat-sealing layer (HS layer), a non-heat-sealing layer (NHS layer), and a hydrophobic coating;
wherein at least a first portion of the HS layer fills the peripheral region, and the NHS layer is absent as a cover on the HS layer in the peripheral region;
wherein at least a first portion of the NHS layer fills the central region, and the HS layer is absent as a cover on the NHS layer in the central region;
wherein at least a first portion of the hydrophobic coating covers at least part of the first portion of the NHS layer in the central region; and
wherein the HS layer is patterned such that it fills the peripheral region but is absent from the central region, and the NHS layer is substantially coextensive with the outer major surface, the NHS layer being located between the substrate and the HS layer.

16. A lidding film having on one side thereof a peripheral region that encircles a central region, the lidding film comprising:
a substrate having an outer major surface on which is disposed at least a heat-sealing layer (HS layer), a non-heat-sealing layer (NHS layer), and a hydrophobic coating;
wherein at least a first portion of the HS layer fills the peripheral region, and the NHS layer is absent as a cover on the HS layer in the peripheral region;
wherein at least a first portion of the NHS layer fills the central region, and the HS layer is absent as a cover on the NHS layer in the central region;
wherein at least a first portion of the hydrophobic coating covers at least part of the first portion of the NHS layer in the central region; and
wherein the NHS layer is patterned such that it fills the central region but is absent from the peripheral region, and the HS layer is patterned such that it fills the peripheral region but is absent from the central region.

17. The film of claim 16, wherein the NHS layer and the HS layer overlap in an intermediate region between the peripheral region and the central region.

18. A package, comprising:
a container defining a product cavity, the container comprising a rim; and
the lidding film of claim 1, 15 or 16,
wherein at least the first portion of the HS layer sealably contacts the rim.

* * * * *

UNITED STATES PATENT AND TRADEMARK OFFICE
CERTIFICATE OF CORRECTION

PATENT NO. : 11,203,189 B2
APPLICATION NO. : 16/309797
DATED : December 21, 2021
INVENTOR(S) : Xiangke Shi and Kevin P. Nelson It is certified that error appears in the above-identified patent and that said Letters Patent is hereby corrected as shown below:

In the Specification

Column 1, Line 46: Delete "primed" and insert -- printed --, therefor.
Column 2, Line 43: Delete "NITS" and insert -- NHS --, therefor.
Column 2, Line 66: Delete "alone" and insert -- along --, therefor.
Column 3, Line 4: Delete "Those" and insert -- These --, therefor.
Column 3, Line 44: Delete "tart" and insert -- but --, therefor.
Column 3, Line 63: Delete "hut" and insert -- but --, therefor.
Column 4, Line 8: Delete "hut" and insert -- but --, therefor.
Column 5, Line 34: Delete "422e" and insert -- 422c --, therefor.
Column 5, Line 34: Delete "422e" and insert -- 422c --, therefor.
Column 5, Line 35: Delete "424e" and insert -- 424c --, therefor.
Column 6, Line 9: Delete "sec" and insert -- see --, therefor.
Column 6, Line 35: Delete "429" and insert -- 420 --, therefor.
Column 6, Line 59: Delete "(0.025-13 mm)" and insert -- (0.025-1.3mm) --, therefor.
Column 6, Line 67: Delete "444" and insert -- 440 --, therefor.
Column 7, Line 7: Delete "115" and insert -- HS --, therefor.
Column 7, Line 20: Delete "fir" and insert -- for --, therefor.
Column 7, Line 29: Delete "(300o F.) if" and insert -- (300o F). If --, therefor.
Column 7, Line 39: Delete "Ni IS" and insert -- NHS --, therefor.
Column 7, Line 41: Delete "car" and insert -- or --, therefor.
Column 7, Line 48: Delete "heads" and insert -- beads --, therefor.
Column 8, Line 38: Delete "Aerosil 8202" and insert -- Aerosil R202 --, therefor.
Column 8, Line 39: Delete "Aerosil 8805" and insert -- Aerosil R805 --, therefor.
Column 8, Line 39: Delete "Aerosil R8125" and insert -- Aerosil R812S --, therefor.
Column 8, Line 53: Delete "flex" and insert -- flexo --, therefor.
Column 8, Line 57: Delete "439a" and insert -- 430a --, therefor.
Column 9, Line 4: Delete "hut" and insert -- but --, therefor.
Column 9, Line 6: Delete "alter" and insert -- after --, therefor.
Column 9, Line 17: Delete "win" and insert -- will --, therefor.

Signed and Sealed this
Thirty-first Day of January, 2023

Katherine Kelly Vidal
*Director of the United States Patent and Trademark Office*

CERTIFICATE OF CORRECTION (continued)
U.S. Pat. No. 11,203,189 B2

Column 9, Line 41: Delete "460e" and insert -- 460e' --, therefor.
Column 9, Line 59: Delete "NUS" and insert -- NHS --, therefor.
Column 10, Line 14: Delete "scaling" and insert -- sealing --, therefor.
Column 10, Line 44: Delete "howls" and insert -- bowls --, therefor.
Column 11, Line 15: Delete "7200" and insert -- 720a --, therefor.
Column 11, Line 29: Delete "MIS" and insert -- NHS --, therefor.
Column 11, Line 60: Delete "MIS" and insert -- NHS --, therefor.
Column 11, Line 65: Delete "103k" and insert -- 1030a --, therefor.
Column 12, Line 27: Delete "the layer" and insert -- the HS layer --, therefor.
Column 12, Line 47: Delete "MIS" and insert -- NHS --, therefor.
Column 12, Line 53: Delete "MIS" and insert -- NHS --, therefor.
Column 13, Line 20: Delete "FIG 40" and insert -- FIG 4D --, therefor.
Column 13, Line 35: Delete "SUB" and insert -- Sun --, therefor.
Column 15, Line 22: Delete "150 degrees" and insert -- 120 degrees --, therefor.